Dec. 8, 1931.  G. F. WILSON  1,835,253
AUTOMOBILE SERVICE RECORD AND REAR VIEW MIRROR COVER
Filed June 9, 1930
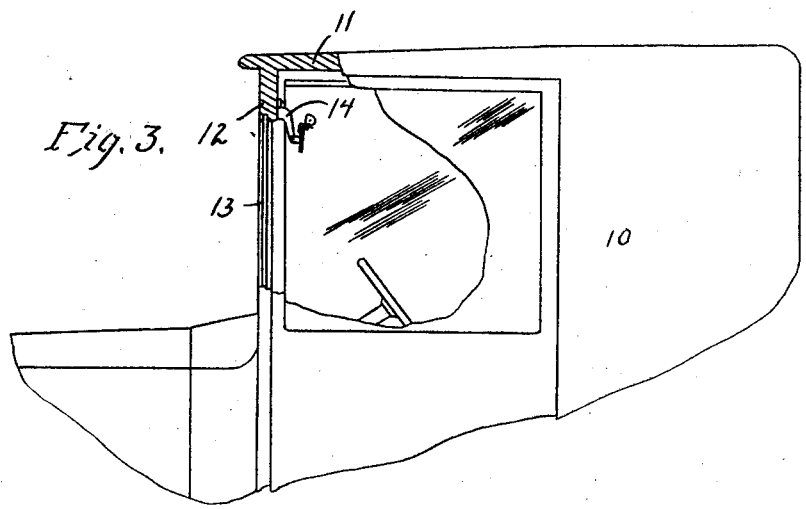
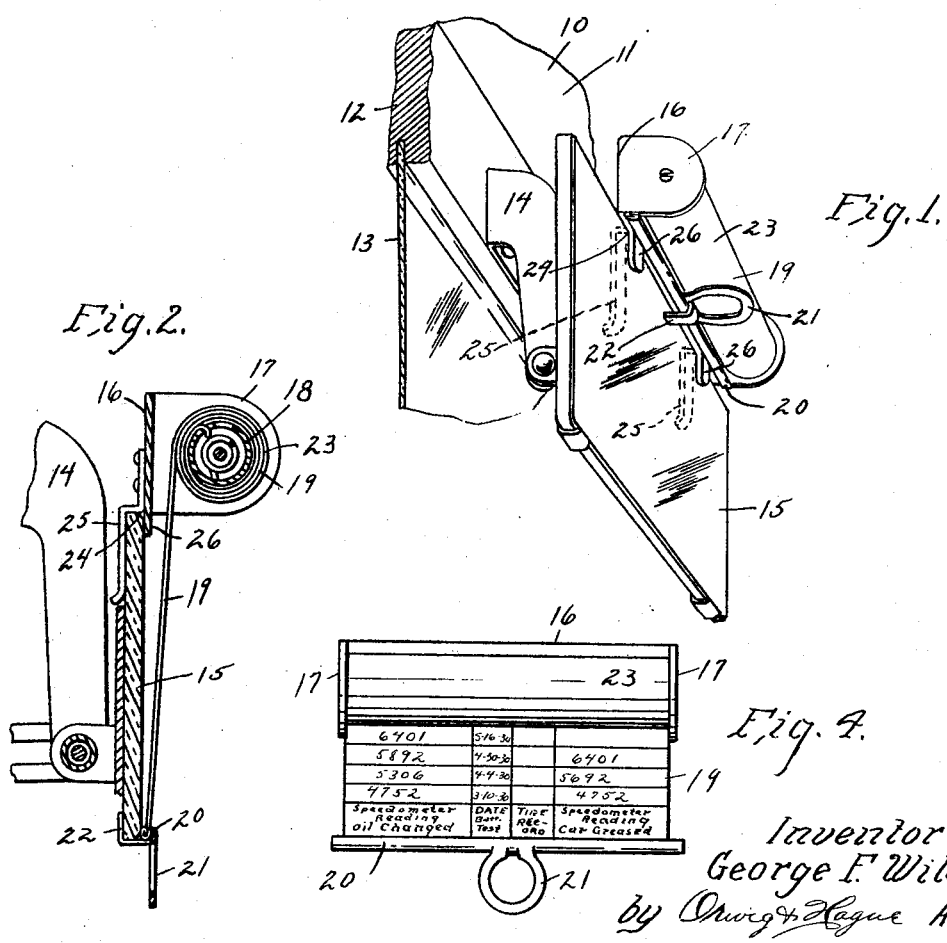
Inventor
George F. Wilson
by Orwig & Hague Attys Patented Dec. 8, 1931

1,835,253

UNITED STATES PATENT OFFICE

GEORGE F. WILSON, OF DES MOINES, IOWA

AUTOMOBILE SERVICE RECORD AND REAR-VIEW MIRROR COVER

Application filed June 9, 1930. Serial No. 459,947.

The object of my invention is to provide a device of simple, durable and inexpensive construction, which may be easily and quickly applied to the rear-view mirror of an automobile, and when so applied will provide means for keeping a record of the speedometer readings, showing when the crank case oil was changed, the automobile greased and other automobile service records; and also to provide means whereby the mirror may be covered to prevent glare of lights from the rear.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a perspective view of my improved device, showing the manner in which it is applied to the rear-view mirror of an automobile.

Figure 2 is a vertical, detail sectional view of the same, showing the record curtain in a lowered position, such as it would assume when the record is being placed thereon and also while serving as a blind for the mirror.

Figure 3 shows the manner in which the mirror and my improved device are applied to an automobile.

Figure 4 is a front elevation of a mirror showing the curtain in its lowered position.

The numeral 10 indicates an automobile body having a top 11 and a windshield supporting frame 12, in which is mounted the windshield 13, all of which are of the ordinary construction. Secured to the inner face of the member 12 is a bracket 14 designed to support the adjustable rear-view mirror 15, also of the ordinary construction. These mirrors are so constructed that their upper edges are substantially free of any support, the supporting bracket being applied to the central portion of the back of the mirror.

My improved device comprises a curtain supporting bracket 16 having its ends bent laterally to provide supporting ears 17 in which is mounted a spring actuated roller 18. Said roller 18 has wound thereon a curtain 19, the free edge of which is provided with a metal binding 20, the central portion of said binding being provided with a finger hold 21, preferably in the form of a loop. The member 20 is also provided with a hook 22 designed to engage the lower edge of the mirror 15 when said curtain is in its lowered position and prevents the curtain from being wound on the roller by action of the spring 23 mounted therein. The spring roller is of the construction similar to the ordinary window shade rollers.

The bracket 16 is provided with downwardly extending hook members 24 having legs 25 designed to engage the back surface of the mirror 15, and shorter leg portions 26 designed to engage the front face of the mirror. Said hooks 24 are connected to the lower edge of the bracket 16 so that the said bracket and the rolled curtain thereon will be supported above the upper edge of the mirror, where it will not normally interfere with the operation of said mirror.

The hook 22 is so arranged that its end will rest normally against the mirror 15 and support the member 21 in substantially a horizontal position, and also in a plane at or above the upper edge of the mirror in the manner clearly illustrated in Figure 1, so that it will not interfere with the operator's unobstructed use of the mirror.

The front surface of the curtain 19 may be ruled in any desirable manner, so that a record may be kept thereon of the speedometer readings showing when the crank case oil was changed, the automobile greased, and other automobile service records, said record being easily applied at the time the oil is changed or the car greased by simply pulling the curtain to the desired position over the mirror. The mirror may then be used as a support for the curtain and the record applied thereto with a pencil or pen, after which the curtain may be again rolled upon the roller 18, or the curtain may be moved to a lowered position and used as a blind for preventing glare of the lights of an automobile approaching from the rear.

Thus it will be seen that I have provided an improved automobile service record, which may be easily and quickly applied to the mirror to act as an automobile service record, or as a blind in the manner above described.

I claim as my invention:

1. In a device of the class described, the combination of a vertically arranged supporting plate, a roller supporting bracket, a spring roller mounted therein, a curtain for said roller, means for detachably supporting said bracket on the upper edge of said plate with said roller and bracket near the upper edge of said plate, and means for fastening the curtain in position over the front face of said plate.

2. In a device of the class described, the combination of a vertically arranged plate, a roller supporting bracket, a pair of downwardly projecting hook members secured to the lower edge of said bracket adapted to detachably support the bracket on the upper edge of said plate with the bracket near the top of said plate, a spring actuated roller carried by said bracket, a record curtain carried by said roller and adapted to be moved to position to cover the front face of said plate, a handle at the lower edge of the curtain, and a hook adapted to receive the lower edge of said plate to support said curtain in position in front of said plate, said hook being also so shaped as to engage the front of the plate when the curtain is rolled up and to thereby hold said handle away from the face of the plate.

3. In a device of the class described, a roller supporting bracket, a pair of downwardly projecting hook members secured to the lower edge of said bracket adapted to detachably support the bracket on the upper and horizontal edge of a vertically arranged mirror with the bracket near the top of said mirror, a spring actuated roller carried by said bracket, a record curtain carried by said roller and adapted to be moved to position to cover the front face of said mirror, and a hook adapted to receive the lower edge of said mirror and to support said curtain in position in front of said mirror.

4. In a device of the class described, a bracket having laterally projecting ears, a spring actuated roller mounted to and between said ears, means for detachably supporting said bracket on the upper horizontal edge of a vertically arranged mirror with the bracket near said upper edge, a curtain for said roller adapted to be moved downwardly over the front face of said mirror, and means for fastening the lower edge of said curtain to the lower edge of said mirror, whereby the curtain may be used either as a blind or as a service record sheet.

Des Moines, Iowa, May 26, 1930.

GEORGE F. WILSON.